April 4, 1967 N. O. ROSAEN 3,312,344
FILTER DEVICES
Original Filed Oct. 15, 1962 2 Sheets-Sheet 1
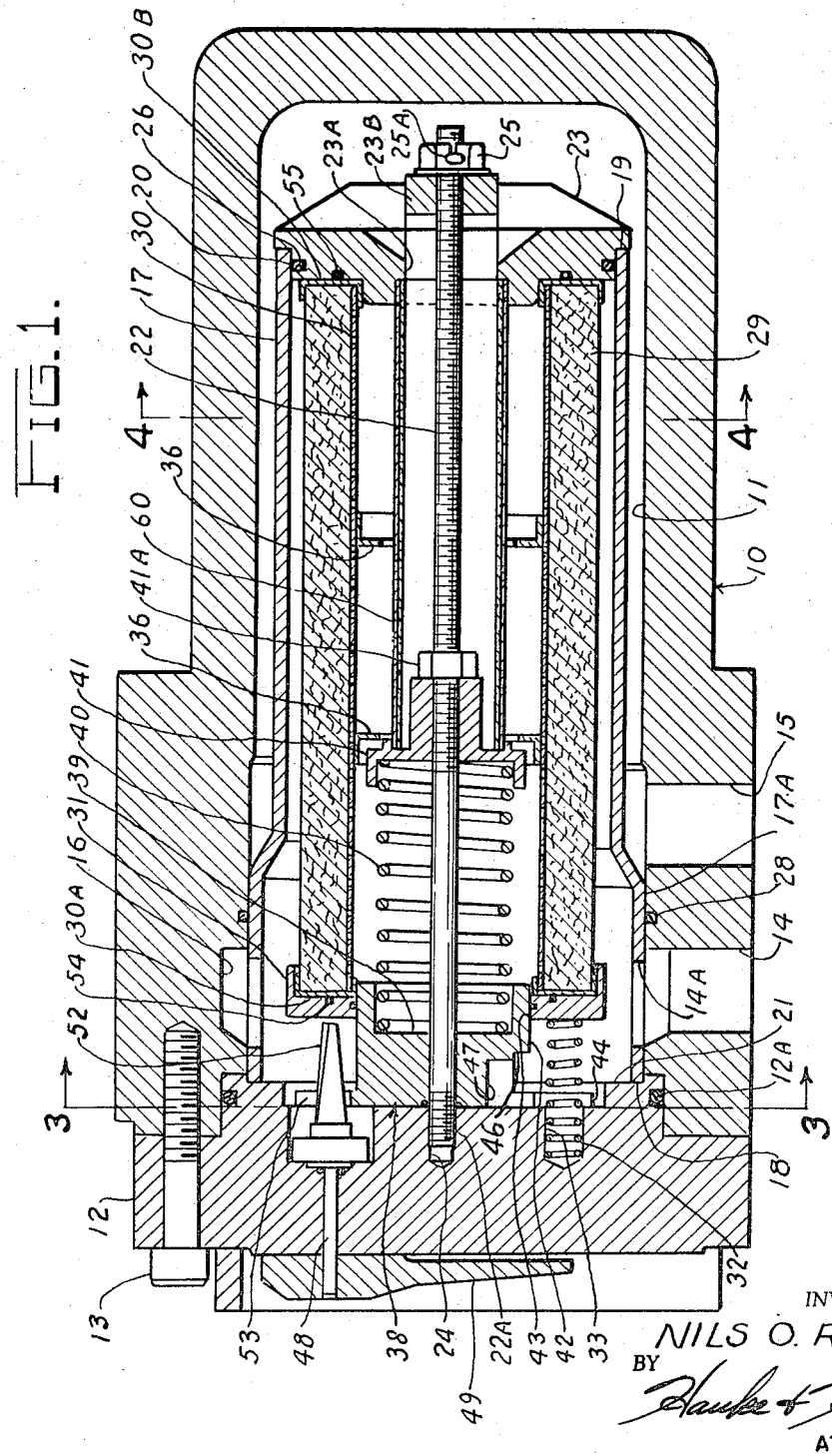
INVENTOR.
NILS O. ROSAEN
BY
*Hauke & Hauke*
ATTORNEYS

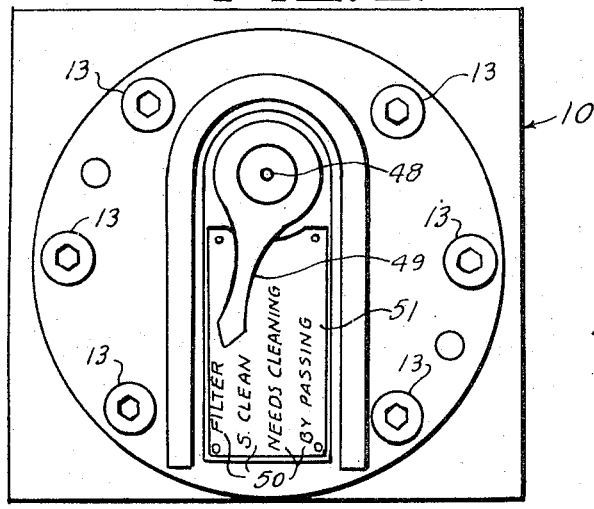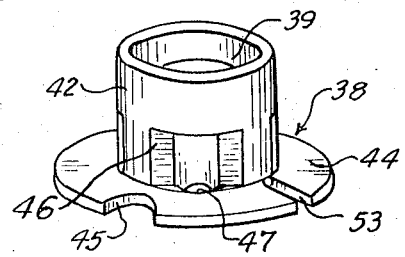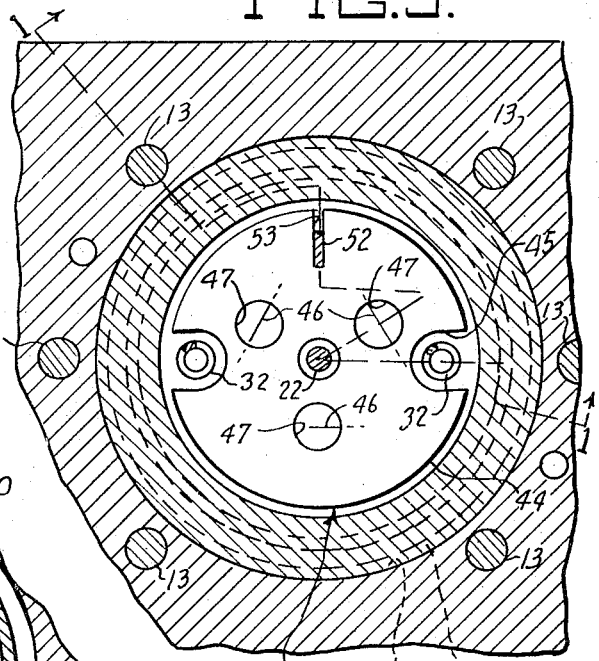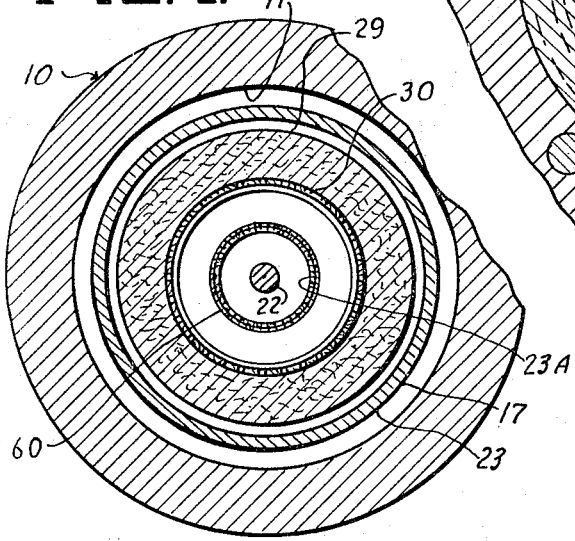

United States Patent Office 3,312,344
Patented Apr. 4, 1967

3,312,344
FILTER DEVICES
Nils O. Rosaen, Bloomfield Hills, Mich., assignor to The Rosaen Filter Company, Hazel Park, Mich., a corporation of Michigan
Original application Oct. 15, 1962, Ser. No. 230,473, now Patent No. 3,239,062, dated Mar. 8, 1966. Divided and this application Sept. 24, 1965, Ser. No. 489,973
5 Claims. (Cl. 210—90)

This application is a division of my copending application Ser. No. 230,473, filed Oct. 15, 1962, and now Patent No. 3,239,062.

The present invention relates to fluid filter devices and more particularly to such a device constructed to provide for easy removal and replacement or cleaning of the filter element when it has become clogged.

The filter element of a fluid filter device will eventually become clogged and will require removal from its housing either to clean the element or to replace it. In the filter devices heretofore provided, some of the foreign matter caught by the filter element tends to remain in the housing, and this must be cleaned out before putting the device back into operation.

It is an object of the present invention to facilitate the replacement or cleaning of filter elements by providing a double housing fluid filter device constructed so that foreign matter clogging the element is trapped by the inner housing and removed with the filter element.

Another object of the present invention is to improve fluid filtering devices by providing simplified means for indicating the clogged condition of the filter element.

Still another object of the present invention is to increase the operating time of fluid filtering devices by providing an improved bypass means operable to open a fluid path directly from the inlet to the outlet side of the filter element.

A further object of the invention is to improve filtering devices by providing a readily disassembled and reassembled construction retained against inadvertent loosening of internal components.

Still further objects and advantages will readily occur to one skilled in the art to which the invention pertains upon reference to the following drawings in which like reference characters refer to like parts throughout the several views and in which FIG. 1 is a longitudinal cross sectional view of a preferred embodiment of the present invention and taken substantially on the line 1—1 of FIG. 3 to illustrate parts in displaced position.

FIG. 2 is an elevational end view of the preferred filter device shown in FIG. 1 as seen from the left end of FIG. 1.

FIG. 3 is a cross sectional view taken substantially on the line 3—3 of FIG. 1.

FIG. 4 is a cross sectional view taken substantially on the line 4—4 of FIG. 1.

FIG. 5 is a perspective view of the valve element utilized in the assembly.

Now referring to the drawings for a more detailed description of the present invention, a preferred filter device is shown as comprising an outer housing member 10 provided with a substantially cylindrical chamber 11. A cap member 12 is secured to the outer housing 10 by any means such as screws 13 and closes one end of the chamber 11. The outer housing 10 is provided with an inlet 14, an outlet 15 and an inner annular groove 16 communicating with the inlet 14. Leakage past the cap 12 is prevented by an O-ring seal 12A.

An inner housing member 17, having an annular end edge 18 bearing on an annular seat 21 in the cap member 12, is carried in the chamber 11 by means of a rod 22 and a retaining member 23. The rod 22 has a threaded end 22A carried in a threaded bore 24 provided in the cap member 12 and extends axially through the chamber 11. A castellated nut 25, with a cotter pin 25A, is provided on the free threaded end of the rod 22 and clamps the retaining member 23 against the other annular end edge 19 of the inner housing 17 to bring the housing 17 into retaining engagement with the seat 21. An O-ring seal 20 is provided in an annular groove 26 formed in the retaining member 23 as shown to prevent fluid leakage from the interior of the inner housing 17 past the retaining member 23. A plurality of annularly spaced perforations 14A in the inner housing 17 communicate with the groove 16. The outer housing 10 is provided with an O-ring seal 28 which engages an enlarged portion 17A of the inner housing 17 and prevents fluid leakage into the annular space between the outer housing 10 and the smaller portion of the inner housing 17.

A cylindrical filter element 29, provided with an inner perforated back-up cylinder 30 having end flanges 30A and 30B, is carried in the inner housing 17 substantially coaxially with respect to the rod 22. One end flange 30B is seated against the retaining member 23 and the other end flange 30A is seated in a retainer cup 31. A pair of spring members 32 are seated at one end in recesses 33 provided in the cap member 12 and the other end is compressed against the outer side of the retainer cup 31. The spring members 32 thus clamp the filter element 29 between the retainer cup 31 and the member 23. Perforated spacers 36 inside the cylinder 30 retain the filter element 29 substantially concentric to the rod 22. The retaining member 23 has a central opening 23A and a transverse bridge 23B to permit fluid flow from the interior of the filter element 29 through the space between the housings to the outlet 15.

A valve member 38 is axially slidably carried on the rod 22. The valve member 38 is provided with a cylindrical recess 39 which forms the seat for a spring member 40, and a seat member 41 is threaded on the rod 22 at an intermediate position to provide the seat for the other end of the spring member 40. The seat member 41 is adjustable to vary the compression of the spring member 40 and is locked in place by means of a jam nut 41A. The valve member 38 is provided with an annular surface 42 which slidingly engages an inner annular surface 43 of the annular retainer cup 31. The valve member 38 is provided with a radially extending flange 44 facing the inner surface of the cap member 12 and urged against it by the spring member 40. The flange 44 is provided with annularly spaced slots 45 through which the spring members 32 extend. As can best be seen in FIG. 3, the valve member 38 is preferably provided with a plurality of annularly spaced grooves 46 and a plurality of annularly spaced perforations 47 communicating therewith and with the outer face of the valve which faces the inner side of the cap member 12.

O-ring seals 54 and 55 are provided between the end flange 30A and retainer cup 31 and between the end flange 30B and the retainer member 23 respectively. It is to be noted that the O-ring seals 54–55 are each axially aligned with the rod 22 and are of equal diameter so that the pressures on each end of the filter element 29 are effectively balanced.

A shaft member 48 is rotatably carried in the cap member 12. A pointer element 49 is secured to the pin member 48 and points to indicia 50 provided on an indicator plate 51. An actuator member 52 is carried on the interior end of the pin member 48 and extends through a rectangular slot 53 provided in the flange 44. The actuator member 52 preferably comprises an elongated strip having a substantially uniform twist about its longitudinal axis from end to end. As the valve member 38 moves axially, the twist of the actuator member 52 in combination with the slot 53 produces a rotation of the pin member 48 and the pointer element 49.

A second filter element 60 is carried between the member 41 and the retainer member 23, primarily to trap particles loosened from the inner surfaces of the primary filter 29 which is preferably made of paper. This eliminates the necessity for pre-conditioning the filter 29.

In operation, fluid enters the inlet 14, fills the groove 16 and passes through the perforations 14A and into the interior of the inner housing 17 to the inlet side of the filter element 29. The fluid then passes through the filter elements 29 and 60, through the central opening 23A in the retaining member 23 into the space between the housings 10 and 17, and out the outlet 15.

As the filter element 29 becomes clogged, a pressure differential is created across the valve member 38 since this member is carried intermediate the inlet and outlet side of the filter element 29. The increase in pressure differential produces a corresponding axial movement of the valve member 38 against the pressure of the spring member 40. The grooves 46 and the perforations 47 increase the surface of the valve member 38 exposed to the inlet side of the filter element 29 and thereby facilitate movement in response to changes in pressure differential across the valve member 38. Axial movement of the valve member 38 produces a corresponding rotational movement of the pointer element 49 and thus the indicator plate 51 can be provided with the desired indicia 50 which indicates the condition of the filter element 29.

As the clogging increases and before the filter element 29 is in danger of rupturing, the valve member 38 will have moved sufficiently away from the cap member 12 so that the grooves 46 are in communication with the inner side of the filter element 29. Thus a bypass fluid route is opened between the inlet 14 and the outlet 15. It will be noted that the bypass route does not pass through or in contact with the foreign matter which has previously been filtered from the fluid. This foreign matter is trapped inside the inner housing member 17.

When it is necessary to remove the filter element 29 for replacing or cleaning it, the cap member 12 is removed by removing the screws 13. The entire inner structure of the filter device is secured to the cap member 12 by the rod 22 and nut 25 and will be removed with it. It is apparent that foreign matter which has been filtered from the fluid and collected between the inner housing 17 and the filter element 29 will be removed with the housing 17. Since substantially no foreign matter will be left in the chamber 11, this need not be cleaned before replacing the cap member 12.

The described construction permits the filter element to be cleaned or replaced with little loss of time since the unit comprised of the cap member, inner housing and filter element may be quickly removed and replaced with a clean or new unit and immediately returned to operation.

It will be noted also that the cup member 31 carrying the outer end of the filter element 29 is normally positioned radially inwardly of the ports 14A so as to form a baffle for the entering fluid from the ports 14A and prevent the force of fluid from directly impinging on the filter element 29 which otherwise may be damaged.

Although I have described but one embodiment of the present invention, it is apparent that many changes and modifications can be made without departing from the spirit of the invention or the scope of the appended claims.

I claim:
1. A filter device comprising
 (a) a housing having a chamber, an inlet and an outlet opening to said chamber and an opening provided at one end,
 (b) a filter carried in said housing intermediate said inlet and said outlet,
 (c) pressure responsive means carried in said housing intermediate the inlet side and the outlet side of said filter element,
 (d) said pressure responsive means being operable to move axially in response to changes in the pressure differential across said filter element,
 (e) bypass means opening a fluid path between said inlet and said outlet bypassing said filter element when said pressure responsive means reaches a predetermined axial position, and
 (f) an end cap removably mounted to said housing to close said opening and indicator means indicating the axial position of said pressure responsive means, said indicating means comprising, a slot provided in said pressure responsive means, an actuator member rotatably mounted to said cap member and engaging in said slot; said actuator member comprising a strip having a twist about its longitudinal axis from end to end thereof and extending in the direction of movement of said pressure responsive valve whereby movement of said pressure responsive means produces rotation of said actuator member and a pointer member carried exteriorly of said housing and secured to said actuator member for rotation therewith.

2. The device as defined in claim 1 and in which said pressure responsive means comprises an annular member axially slidably carried in said housing and having opposite surfaces exposed to the inlet side of said filter element and the outlet side of said filter element respectively.

3. A filter device comprising
 (a) a housing provided with an opening at one end and having an inlet and an outlet,
 (b) a filter carried in said housing intermediate said inlet and said outlet,
 (c) pressure responsive means carried in said housing intermediate the inlet side and the outlet side of said filter elements,
 (d) said pressure responsive means being operable to move axially in response to changes in the pressure differential across said filter element, and
 (e) an end cap removably mounted to said housing to close said opening and indicator means indicating the axial position of said pressure responsive means, said indicating means comprising a slot provided in said pressure responsive means, an actuator member mounted to said cap member and engaging in said slot, said actuator member comprising a strip having a twist about its longitudinal axis from end to end thereof and extending in the direction of movement of said pressure responsive means whereby movement of said pressure responsive means produces rotation of said actuator member and a pointer member carried exteriorly of said cap member and secured to said actuator member for rotation therewith.

4. A filter device comprising
 (a) a housing provided with an opening at one end and having an inlet and an outlet,
 (b) a substantially cylindrical filter element carried in said housing and having an outer annular inlet surface and an inner annular outlet surface,
 (c) said filter element having an axial opening at each end with means provided at one end for connecting the opening thereof with said outlet,
 (d) a pressure responsive member axially slidably mounted within and closing the opening in the opposite end of said filter element whereby the inner end of said pressure responsive member is exposed to the fluid pressure on the outlet side of said filter element,
 (e) means directing fluid from said inlet to the opposite side of said pressure responsive member whereby said pressure responsive member moves in said opening in response to changes in the pressure differential across said filter element, and (f) an end cap removably secured to said housing to close said opening and indicator means indicating the axial position of said pressure responsive member, said means comprising a slot provided in said pressure responsive member, an actuator member rotatably mounted to said end cap and engaging in said slot, said actuator member comprising a strip having a twist about its longitudinal axis from end to end thereof and extending in the direction of movement of said pressure responsive member whereby movement of said pressure responsive member produces rotation of said actuator member and a pointer element carried exteriorly of said end cap and secured to said actuator for rotation therewith.

5. The filter device as defined in claim 4 and in which said pressure responsive member includes means opening a fluid path through said opening at a predetermined axial position of said pressure responsive member.

References Cited by the Examiner

UNITED STATES PATENTS

| | | | |
|---|---|---|---|
| 1,290,814 | 1/1919 | Weaver | 73—320 X |
| 1,664,558 | 4/1928 | Hastings | 73—320 |
| 3,080,058 | 3/1963 | Rosaen | 210—90 |
| 3,239,062 | 3/1966 | Rosaen | 210—90 |

FOREIGN PATENTS 240,347  8/1962  Australia.

REUBEN FRIEDMAN, *Primary Examiner.*

SAMIH N. ZAHARNA, *Examiner.*